Oct. 20, 1953

L. E. PHILIPPS
STATION SELECTOR AND RECORDING
SYSTEM FOR RADIO SERVICE 2,656,522

Filed June 3, 1949

6 Sheets-Sheet 1

INVENTOR.
LOUIS E. PHILIPPS
BY
Hyde, Meyer, Baldwin & Doran
ATTORNEYS

INVENTOR.
LOUIS E. PHILIPPS
BY
Hyde, Meyer, Baldwin & Doran
ATTORNEYS

INVENTOR.
LOUIS E. PHILIPPS
BY
Hyde, Meyer, Baldwin & Doran
ATTORNEYS

INVENTOR.
LOUIS E. PHILIPPS
BY
Hyde, Meyer, Baldwin & Doran
ATTORNEYS

INVENTOR.
LOUIS E. PHILIPPS
BY
Hyde, Meyer, Baldwin & Doran
ATTORNEYS

Oct. 20, 1953

L. E. PHILIPPS

STATION SELECTOR AND RECORDING SYSTEM FOR RADIO SERVICE 2,656,522

Filed June 3, 1949

6 Sheets-Sheet 6

INVENTOR.
LOUIS E. PHILIPPS

BY

Hyde, Meyer, Baldwin & Doran
ATTORNEYS

Patented Oct. 20, 1953

2,656,522

UNITED STATES PATENT OFFICE 2,656,522

STATION SELECTOR AND RECORDING SYSTEM FOR RADIO SERVICE

Louis E. Philipps, Cleveland Heights, Ohio, assignor to Radio Systems, Incorporated, Cleveland, Ohio, a corporation of Ohio Application June 3, 1949, Serial No. 97,058

2 Claims. (Cl. 340—147)

This invention relates to improvements in a station selecting and recording system for radio service.

One of the objects of the present invention is to provide novel means for selecting any desired one of a large number of stations where electrical equipment such as a radio loudspeaker is to be connected and novel means for completing an electrical circuit through the selected station only, together with means for insuring that no other station, not selected, will be energized.

Another object of the present invention is to provide electrical circuits for selecting and energizing a given station out of a large number using a minimum amount of electrical equipment so that the equipment is used in the most efficient manner and so that the system will operate most efficiently and also so that trouble shooting may be accomplished most expeditiously.

A further object of the invention is the provision of novel means for recording the station selected simultaneously with the selection and energization of the selected station.

Another object of the present invention is the provision of novel means for making a printed record as to the station selected and as to the time that the station was energized or deenergized, all this being accomplished simultaneously with the selection and energization or deenergization of a station so that the system is foolproof.

A still further object of the present invention is to utilize a modified style of well-known adding machine for selecting a given station and for recording the number of the station and the time when it was energized or deenergized.

Other objects and advantages of the present invention will appear from the accompanying drawings and description and the essential features thereof will be set forth in the appended claims.

In the drawings, Fig. 1 is a diagrammatic view showing the electrical circuits in a portion of one form of my invention, sufficient circuits being shown so that the entire system may be understood;

Figures 3, 10:
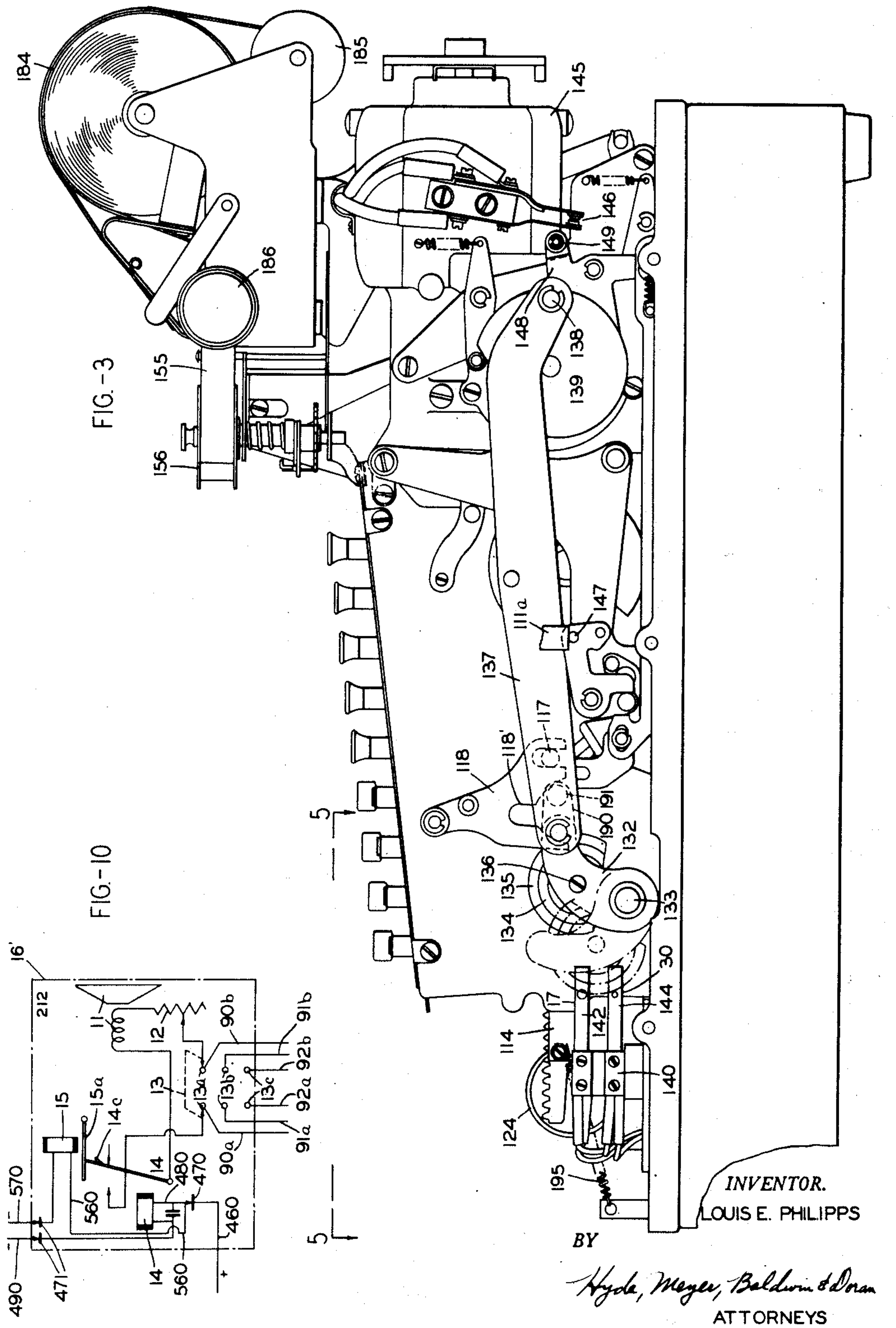
Fig. 3 is a side elevational view of the instrument of Fig. 2 with the cover removed and with certain parts deleted so that the remainder is more clearly shown.
Figure 4:
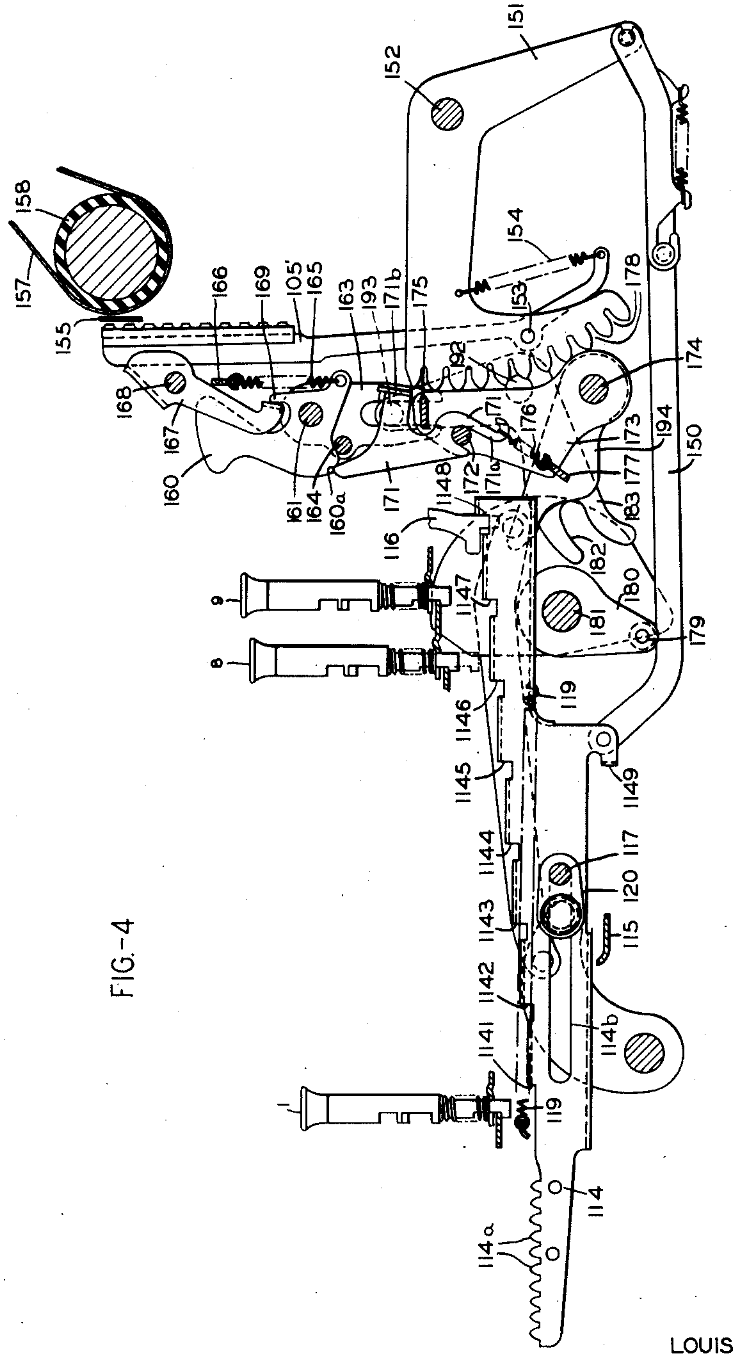
Fig. 4 is a transverse sectional view through the instrument of Fig. 2 taken along the line 4—4 thereof and with certain parts omitted for clearness.
Figure 9:
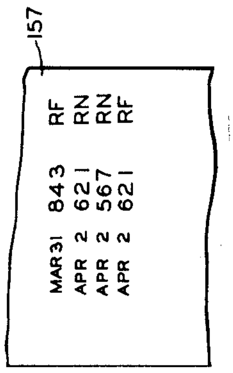
Figure 5:
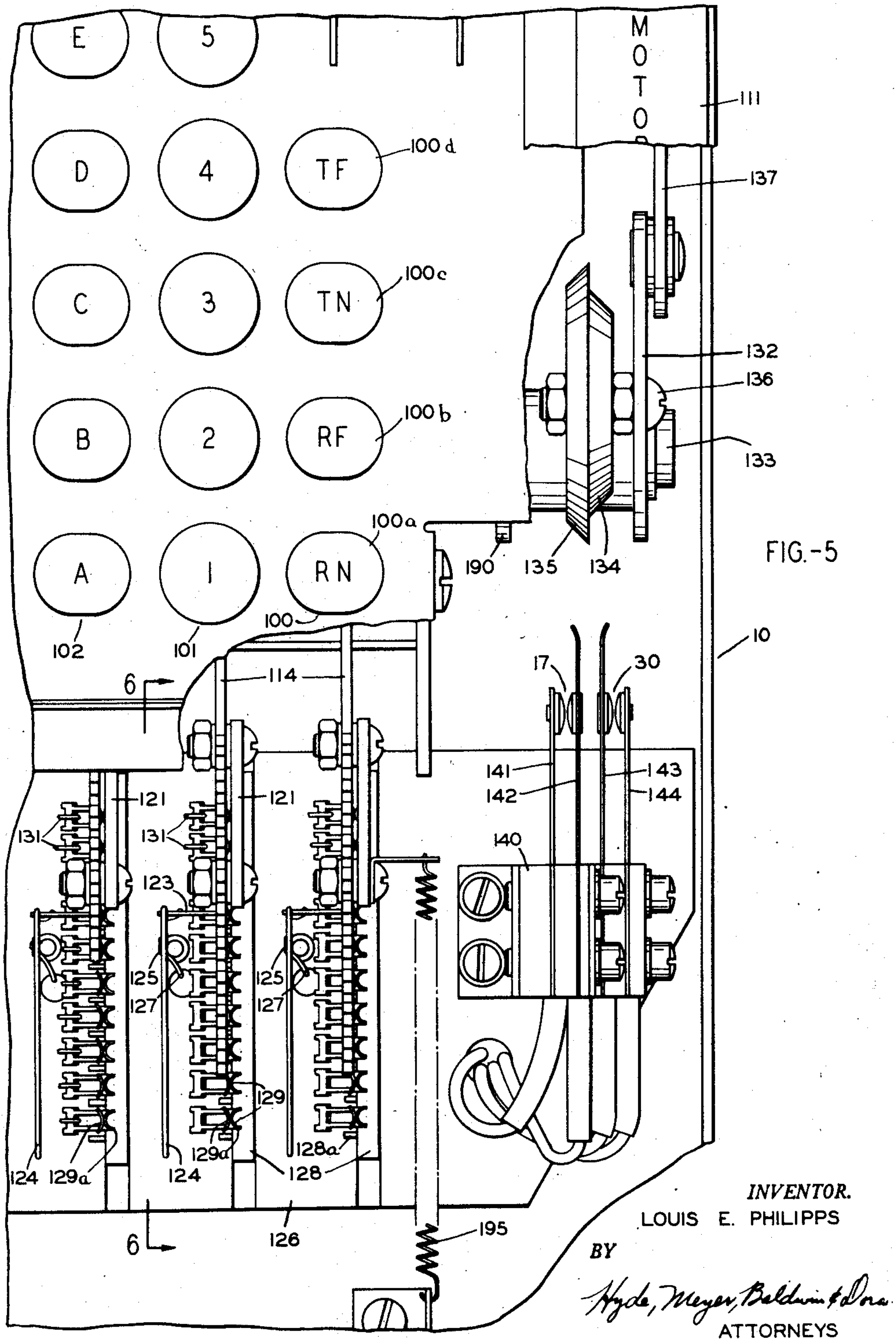
Figures 6, 7, 8:
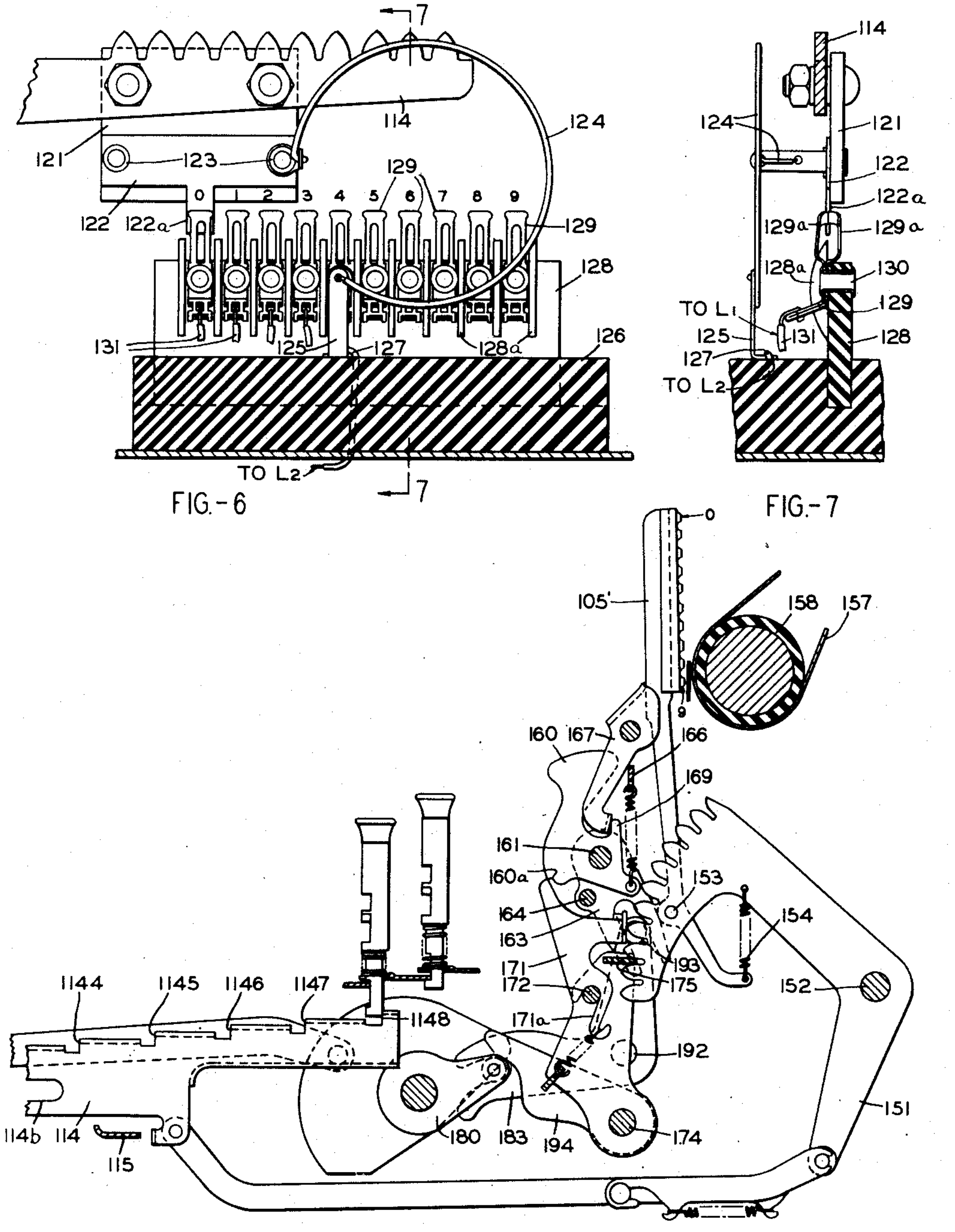

Fig. 5 is a fragmental top plan view enlarged taken along the line 5—5 of Fig. 3 and with parts broken away to more clearly show the electrical contacts;

Fig. 6 is a fragmental sectional view taken along the line 6—6 of Fig. 5;

Fig. 7 is a fragmental sectional view taken along the line 7—7 of Fig. 6;

Fig. 8 is a view of a portion of Fig. 4 showing the parts in another position;

Fig. 9 illustrates a portion of a typical printed record from my machine; while

Figure 1:
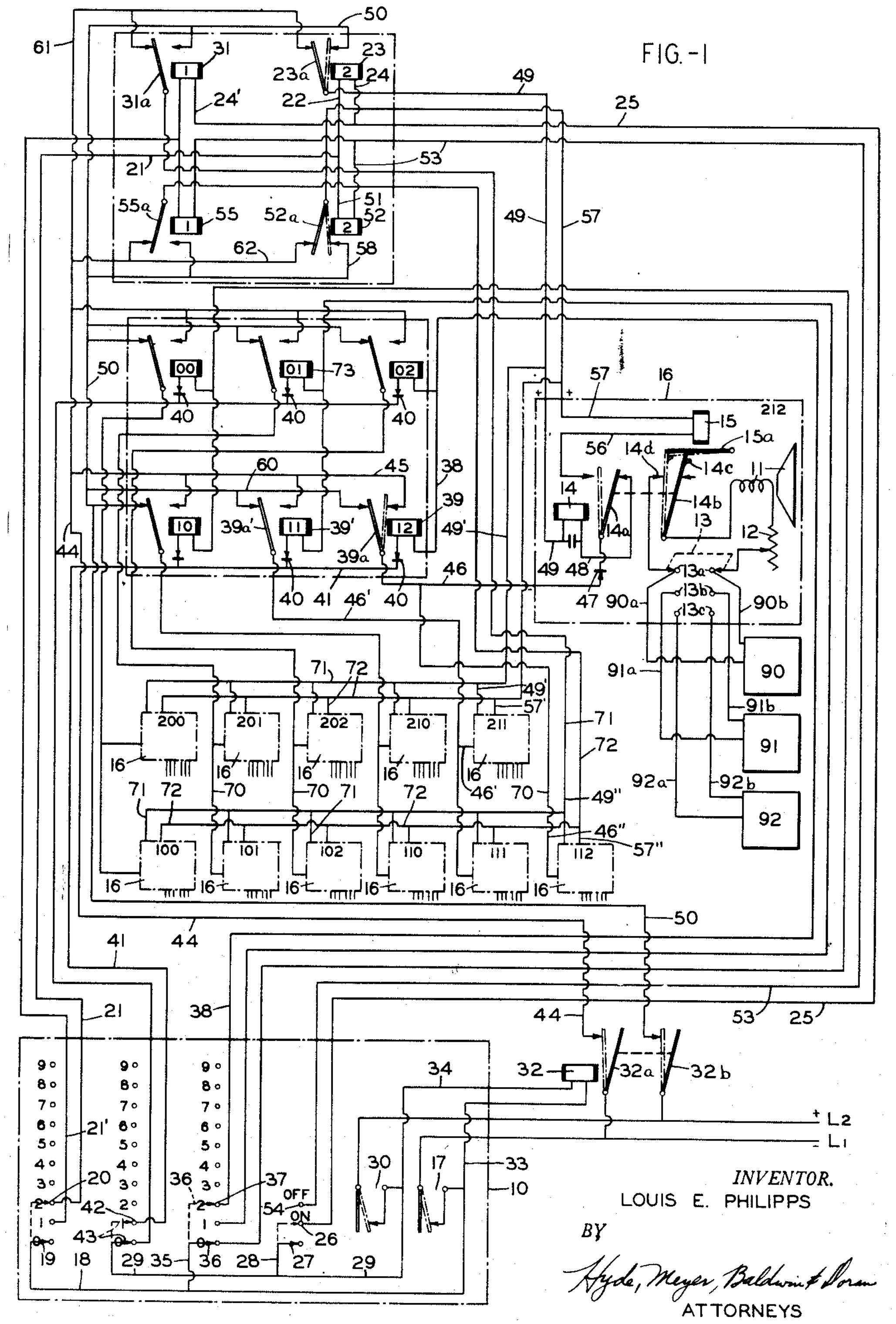

Fig. 10 is a diagram showing a modification of the circuits shown at 16 on the right hand side of Fig. 1.

It should be understood that my system is intended for use in a hotel or hospital wherein radio or television sets or other electrical equipment may be installed in each room and the service is turned on or off at the desire of the occupant of the room. On a commercial scale, it is desirable that the occupant of the room be charged only when he is using such service. By the use of my system, it is possible to do away with all coin operated mechanisms or other means for individually connecting and disconnecting service in the various rooms, but instead all of the operations are accomplished from a single station by a very simple system which might be operated for instance by the telephone operator at a central switchboard using her spare time only. Since the connecting of a radio loudspeaker in a room is a typical example of electrical equipment energized and deenergized by the use of my system, I will use this term in my description and in some of the claims as being synonymous with any piece of electrical equipment which it is desired to turn on or off at each individual station when selected. Since the individual stations where equipment is to be turned on and off will usually be found in large groups which may be broken down into subgroups, which may in turn be broken down into individual stations, I may hereafter in my specification and claims use the term "floor" as indicating a large group of stations and I may use the term "hundreds" as indicating the selective unit since quite commonly all of the floors of a hotel or the like are designated by a series all in the same hundreds of numbers. I shall also hereafter use as synonymous with the term "subgroup," such terms as "tens" or "twenties" as indicating respectively a series of rooms having numbers from ten to nineteen inclusive or another group of rooms having numbers from twenty to twenty-nine inclusive, and so forth. As representative of the term "station" I may hereafter use the term "room" because normally there would be one radio set in room 10 and another radio set in room 11, and so forth. In a hospital room where there were two beds and a radio loudspeaker at each bed which might be provided with service at the will of the patient, the term "station" would not mean a room, but might mean bed A or bed B in a certain room.

I shall first describe the electrical circuits of Fig. 1 and will later describe the specific mechanism which I use to establish these circuits and to make a record of the service turned on or off at a given station.

In Fig. 1, I have illustrated the equipment in a few rooms of the one-hundred series and a few rooms of the two-hundred series as it will be obvious that this equipment might be multiplied for other series of rooms on different floors and might be expanded to cover as many numbers in the hundred series as might be desired. I have also shown only a few individual rooms such as "00", "01", "02", and so forth. Also in the ten series, I have shown "10", "11" and "12". In any complete series of number, there would be individual relays from "00" to "99".

Figure 2:
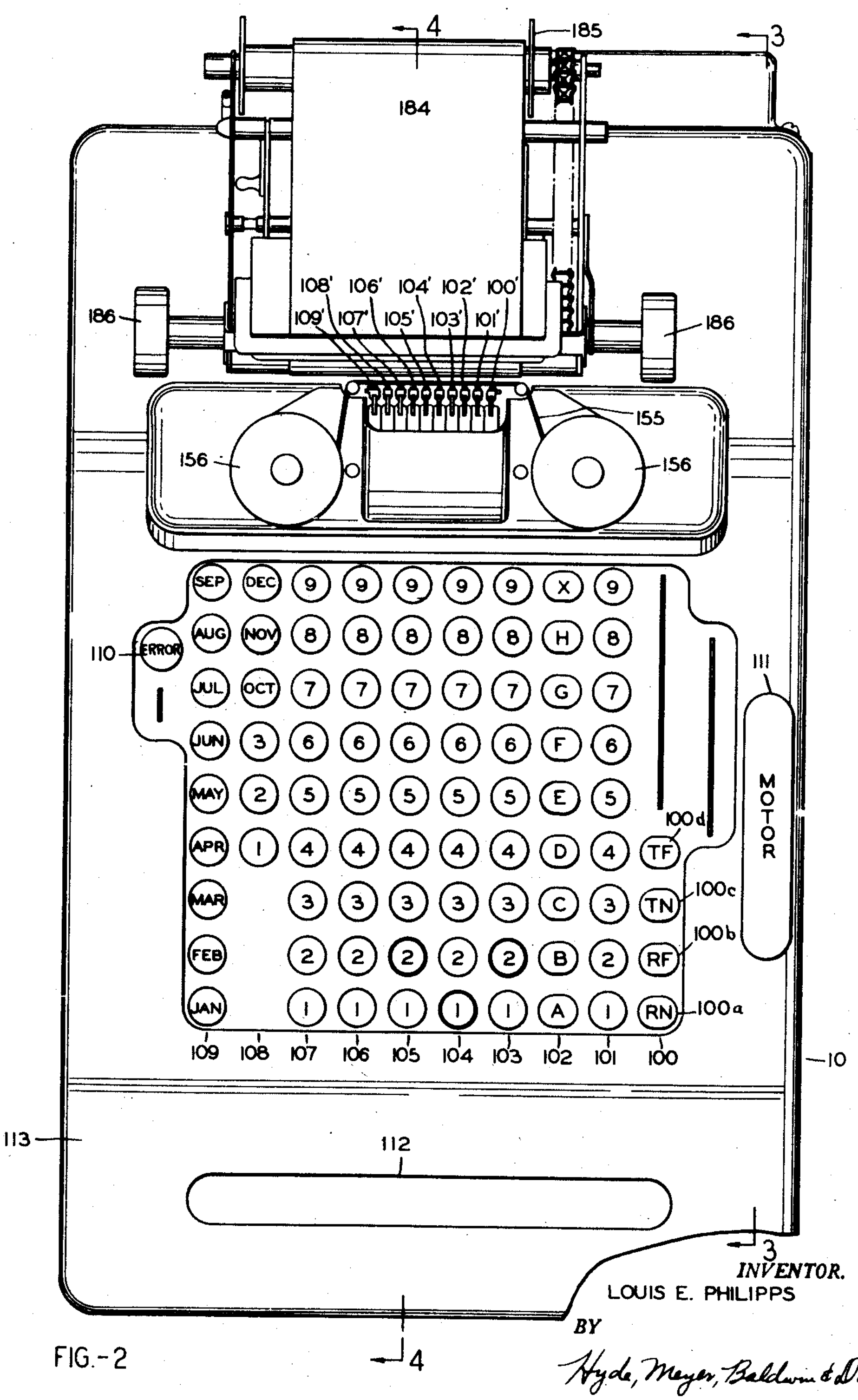
Fig. 2 is a top plan view of a modified adding machine used as my main control instrument.

In the diagram of Fig. 1, the modified adding machine or main control instrument 10 of Fig. 2 is shown diagrammatically by a dot-dash box in the lower left-hand corner of the diagram. The details of this instrument will be described later. For simplicity, only three rows of adding machine numbers for selecting the hotel room number together with the radio "on" and radio "off" buttons are shown in the diagram. A cabinet 16 is shown for housing the equipment in each individual room. These cabinets are shown as small squares for rooms 200, 201, 202, 210 and 211. They are also shown in a similar manner for rooms 100, 101, 102, 110, 111 and 112. The cabinet 16 for room 212 is shown enlarged at the central portion at the right-hand side of the diagram of Fig. 1 and it should be understood that all of the cabinets 16 contain identical equipment. In each room where the system is installed therein, there is a loudspeaker 11, a volume control 12, a station selector switch 13, a radio "on" relay 14 and radio "off" relay 15. Room 212 will be used as an example to describe the circuit for turning the radio on or off in that room, it being understood that all other room circuits will be similar.

When the occupant of room 212 desires to have the radio turned on, a message is sent to the operator sitting near the main control instrument as shown in Fig. 2. If this is the telephone operator, then it is only necessary for the occupant of room 212 to pick up the telephone and tell the operator that radio service is desired in room 212. The operator will then depress the keys on the main control instrument corresponding to room 212. In the instrument illustrated in Fig. 2, the proper buttons are indicated in heavier circles. The operator will also depress the radio "on" key of the main control instrument which is indicated by the letters RN of Fig. 2. The operator then depresses the motor control key marked "motor" at the right-hand side of Fig. 2 which will initiate one cycle of the modified adding machine to complete the following circuits:

Starting from line $L_1$ of the energizing circuit, the circuit will then include switch 17 in its dot-dash position, line 18, sliding contact 19 and contact 20 (to be later described) in the hundreds row of the modified adding machine, line 21, line 22, relay 23 (which is the radio "on" relay for all rooms in the two-hundred series), line 24, line 25, contact 26 and sliding contact 27 (associated with the row 100 of the modified adding machine), line 28, line 29, switch 30 in its dot-dash position, to $L_2$, the other side of the energizing circuit. Relay 23 is now energized, swinging the armature 23*a* to the right or to the dot-dash position as indicated in the diagram of Fig. 1. It should be noted that relay 23 is now in position to energize any room in the two-hundred series. It will be noted that relay 31 would have been similarly energized for all of the rooms of the one-hundred series if the button No. 1 in the hundreds series on the modified adding machine had been depressed. In such a case, the circuit would have been through the line 21′ from the "100" button to relay 31 and then through line 24′ and line 25 as previously described for relay 23. It will be understood that similar relays to 31 and 23 will be provided for each of the other series of numbers represented by the buttons "300", "400" and so forth.

When the operator set the buttons for room 212, the following circuit was established for all rooms ending in the number "12":

From line $L_1$, switch 17 in its dot-dash position, line 18, line 35, sliding contact 36 and contact 37 in the digit row of the modified adding machine (in this case "2"), line 38, relay 39 (which is for all rooms ending in 12), rectifier 40 (for permitting electrical flow in one direction only), line 41, contact 42 and sliding contact 43 in the "tens" row of the modified adding machine (in this case "10"), line 29, switch 30 to $L_2$. Relay 39 is now energized moving the armature 39*a* to the right or to the dot-dash position as shown in Fig. 1.

When switches 17 and 30 were closed on the main control instrument of Fig. 2, relay 32 is energized from $L_1$ to switch 17 in its dot-dash position, line 33, relay 32, line 34, switch 30 in its dot-dash position, to $L_2$, moving the armatures 32*a* and 32*b* to the left or to the dot-dash position as shown in Fig. 1.

With relays 23, 32 and 39 now energized, a circuit is completed to the equipment in cabinet 16 in room 212 to turn the radio on as follows:

From $L_1$, armature 32*a* of relay 32 in its dot-dash position, line 44, line 45, armature 39*a* in its dot-dash position, line 46, rectifier 47, armature 14*a* in its full line position, line 48, relay 14, line 49, armature 23*a* in its dot-dash position, line 50, armature 32*b* in its dot-dash position to $L_2$. Relay 14 is now energized and moves its armatures 14*a* and 14*b* to the left or to their dot-dash position as shown in Fig. 1. Means is provided for maintaining armatures 14*a* and 14*b* in their dot-dash position of Fig. 1, that is, in their energized position. In the present instance, the relay 15 is arranged to lock the armatures 14*a* and 14*b* in their closed position. As the armature 14*b* moves to the left as viewed in Fig. 1, the armature 15*a* of relay 15 drops down until it is stopped by a projection 14*c* on the armature 14*b*. The armature 15*a* will now hold the armatures 14*a* and 14*b*, which are rigidly inter-connected, to the left in the dot-dash position shown in Fig. 1. The loudspeaker circuit is now energized. It will be noted that the broadcasting station selector switch 13 is movable to one of several positions, in each of which it connects a selected radio receiver 90, 91 or 92 to the loudspeaker 11. In the positions shown in Fig. 1, the selector switch 13 connects the leads 90a and 90b from the receiving set 90 which is kept tuned to a certain station indicated on the selector switch. The program of that station will now be communicated to the loudspeaker 11 through the circuit, switch 13, contact 14d, armature 14b in its dot-dash position, the coil of speaker 11, the volume control 12, back to the switch contact 13a. It will be noted that if switch 13 were in engagement with contact 13b, the circuit would be completed through lines 91a and 91b to receiver 91 which would be tuned to another station. In like manner, the movement of the selector switch to the contacts 13c would connect receiver 92 with the loudspeaker 11. Any number of receivers can be connected to the selector switch 13 in this manner.

In all of the rooms of the same "hundreds" series as the relay 23, in this case the two-hundred series, all relays 14 in rooms other than 212 are now shorted out as follows:

Taking room 211 as an example, the circuit will be from relay 14 of cabinet 16 in room 211 through line 49' which is analogous to line 49 of room 212, then through the common line 49, armature 23a in its dot-dash position, line 59, line 60, armature 39a' of the relay 39' which controls all rooms ending in the number 11, line 46', the rectifier 47 in room 211, the armature 14a in room 211 in its unoperated or full line position, and the line equivalent to line 48 back to relay 14.

The relays 14 in all other rooms ending in the number 12, except 212, will be shorted out also. Taking room 112 as an example, the circuit will be as follows:

From relay 14 in cabinet 16 of room 112, through line 49'', armature 31a in its full line position, line 61, line 45, armature 39a in its dot-dash position and line 46—46'', back to cabinet 16 in room 112 and then through the equipment in that cabinet corresponding to rectifier 47, armature 14a in its full line position and line 48, back to the relay 14.

With the armatures 14a and 14b in the dot-dash position of Fig. 1, there might be a reverse current flow to relay 15 to turn off the radio in room 212. This reverse flow might be as follows:

From $L_1$, armature 32a in its dot-dash position, line 44, line 62, armature 52a in its full line position, line 57, relay 15, line 56, armature 14a in its dot-dash position, rectifier 47, line 46, armature 39a in its full line position, line 60, line 50, armature 32b in its dot-dash position to $L_2$. The flow of current, thus reversed, is not possible because it is blocked by the rectifier 47 which permits flow in the other direction only and therefore prevents energization of relay 15. A similar circuit will be established to all other relays 15, when the armatures are to the left, in the two-hundred series.

If the occupant in room 212 now wishes the radio service turned off, the operator located at the main control instrument of Fig. 2 is notified. This operator depresses the RF button 100b and the keys corresponding to the number 2 in the hundreds row, 1 in the tens row and 2 in the digits row, that is, the same buttons mentioned before and shown in darker circles in Fig. 2. She then depresses the motor key of the main control instrument which will initiate a cycle of the modified adding machine to complete the following circuits:

From $L_1$, switch 17 in its dot-dash position, line 18, sliding contact 19 and contact 20 of the hundreds row of the modified adding machine, line 21, line 51, relay 52, which is the "off" relay for all rooms in the two-hundred series, line 53, contact 54 on the modified adding machine which corresponds to the button marked RF in Fig. 2 indicating radio off, sliding contact 27 coacting with contact 54, line 28, line 29, switch 30 in its dot-dash position to $L_2$. Relay 52 is now energized moving its armature 52a to the right or to the dot-dash position as indicated in Fig. 1. Relay 52 is now energized for all of the rooms of the two-hundred series as mentioned above. If a room in the one-hundred series had been selected, relay 55 would have been energized through lines 21' and line 53.

Relays 32 and 39 are energized as previously described when turning the radio on. A circuit is now completed from $L_1$, armature 32a in dot-dash position, line 44, line 45, armature 39a in its dot-dash position, line 46, rectifier 47, armature 14a in its dot-dash position, line 56, relay 15, line 57, armature 52a in its dot-dash position, line 58, line 50, armature 32b in its dot-dash position to $L_2$. Relay 15 is now energized attracting its armature 15a upwardly as shown in Fig. 1 which permits armatures 14a and 14b of relay 14 to move to the right since they are biased to normally move to the open position. This turns off the loudspeaker 11 by breaking the circuit to the same at 14d.

To prevent the undesired operation of a relay 15 in another room in the two-hundred series, so as to turn off the radio in that room unintentionally, all other relays in the two-hundred series are shorted out. As an example, in room 211, this short circuit will be as follows:

From relay 15 in room 211 through line 57' and line 57, armature 52a in its dot-dash position, line 58, line 60, armature 39a' in its full line position, line 46' back to cabinet 16 in room 211 and to the parts in that cabinet corresponding to rectifier 47, armature 14a in its dot-dash position, and line 56 back to relay 15.

The relay 15 in all rooms whose numbers end in 12 will also be shorted out so as to prevent undesired operation as follows:

Taking room 112 as an example, from relay 15 of that room, line 57'', line 72, armature 55a of relay 55 in its full line position, line 62, line 44, line 45, armature 39a in its dot-dash position, line 46—46'' back to cabinet 16 in room 112 and through the parts in that room equivalent to rectifier 47, armature 14a in its dot-dash position and line 56 back to relay 15.

The flow of current to all of the remaining relays 14 or 15 in the system will have to be in a reversed direction and the rectifier 47 in each circuit will block the flow of current to such relays to prevent them from being energized. A typical circuit to represent this arrangement is as follows:

If relay 14 in room 101 is to be energized, relays 31, 32 and 73 will be energized. The circuit for a possible reverse current flow to relay 14 in room 212 with armatures 14a and 14b in the full line position, is as follows:

From $L_1$, armature 32a in its dot-dash position, line 44, line 61, armature 23a in its full line position, line 49, relay 14, line 48, armature 14a in its full line position, rectifier 47, line 46, armature 39a in its full line position, line 60, line 50, armature 32b in its dot-dash position to $L_2$. The current flow in this reversed circuit is impossible because it is blocked by the rectifier 47, thus preventing energization of relay 14.

A simple piece of equipment for use for the rectifiers 47 and for the rectifiers 40 where indicated and all through the system, is a dry disc rectifier which is very cheap and effective. This will permit flow only in the direction of the arrows shown in the diagram of Fig. 1.

Similar circuits to those above described will be completed whenever the radio "on" key or the radio "off" key on the main control instrument is depressed in conjunction with buttons indicating a room number, for preventing any relay but the desired one from being energized.

The wires 70 leading from the various cabinets 16 correspond to the line 46 leading to cabinet 16 of room 212. The wires 71 correspond likewise to line 49 of room 212 and wires 72 correspond to line 57 of room 212. The six lines indicated extending from the bottom portion of each of the cabinets 16 correspond to the lines 90*a*, 90*b*, 91*a*, 91*b*, 92*a*, 92*b* of room 212 and lead to the same radio receivers 90, 91 and 92 which are thus enabled to service all rooms in the system.

Various types of apparatus might be constructed for providing the control of the various electrical circuits above described and taking the place of the main control instrument as illustrated in Fig. 2. Also various means might be contrived to make a record, printed or otherwise, of the establishing of an "on" connection or the breaking of an "off" connection and various means for recording the time when the radio was turned on or off. I have chosen to utilize for my main control instrument a modified type of adding machine marketed as Model W of the Victor Adding Machine Company, of Chicago, Illinois, in 1949. I do not desire to limt my claims solely to this type of control instrument but utilize the same to show one embodiment of my invention.

In order to understand the operation of my equipment, I will describe certain known features of a standard adding machine and will add thereto specific description of the modifications necessary to perform the new functions as a control instrument in my system. Those familiar with this art will understand that a modern adding machine is a very complex piece of equipment. It would be merely a waste of time to describe here all of the parts which perform the usual adding machine functions. These parts are present, except where the modified portions of the machine clearly indicate the changes which have been made. It should be understood that in general the machine here disclosed as my main control instrument in Fig. 2 and the other views thereof is a standard Victor adding machine of the type described and the parts and their functions are clearly disclosed in one or more of the following Victor patents: No. 1,336,840 granted April 13, 1920 to Oliver D. Johantgen; No. 1,876,057 granted September 6, 1932 to Oliver D. Johantgen; No. 1,876,056 granted September 6, 1932 to Oliver D. Johantgen; No. 2,017,641 granted October 15, 1935 to George J. Uhlig; No. 2,019,439 granted October 29, 1935 to George J. Uhlig; and No. 2,264,949 granted December 2, 1941 to Thomas O. Mehan, and other patents for improvements on the features disclosed in the above mentioned patents.

Those familiar with adding machines of the modern type will understand that there is usually a plurality of rows of numbered buttons as indicated in Fig. 2 from 101 to 107 inclusive. The buttons in each row, running from front to back, are generally numbered from 1 to 9 inclusive, and I have shown such a numbering in rows 101, 103, 104, 105, 106 and 107. I have changed the indicia on the buttons in row 102 to read from A to H of the alphabet and X, so that suites of rooms in a hotel may be so indicated. Obviously, the indicia on these buttons or other buttons in the machine might be made to fit any given room numbering or bed numbering system. In the illustration already given, I have indicated how the room 212 might be indicated by punching the 2 button in row 105 indicating hundreds, the 1 button in row 104 indicating tens, and the 2 button in row 103 indiciating digits. The rows 106 and 107 will permit the recording and connecting of rooms where the numbers run into a larger number of figures. I have added row 100, having button 100*a* to indicate radio "on" and marked RN, button 100*b* for radio "off" and marked RF, button 100*c* marked TN for "television on" and button 100*d* marked TF for "television off." The button 100*a* controls the contact arrangement indicated at 26, 27 in the previous description and button 100*b* controls the contact arrangement indicated at 54, 27 in the previous description. I have also added rows 107, 108 and 109 so that the operator may indicate the date when the radio is turned on or off. In row 109, I have marked the buttons serially from January to September, and in row 108, I have marked three buttons for October, November and December. My invention will be better understood if it is realized that all of these month buttons control a bar which moves beneath the row 109. In other words, the control connections from the buttons marked Oct., Nov., and Dec. are angled downwardly and toward the left as viewed in Fig. 2 so as to control a bar which reciprocates beneath the row 109. The rows 108 and 107 are for the purpose of setting the date. Obviously, any date from 1 to 31 may be set by utilizing these two rows of numbered buttons. The machine also includes the usual error button 110 for clearing the setting if a wrong button has been pushed. The machine also includes the elongated finger bar 111 marked "motor" which has been previously referred to. This is pushed to cause the motor to produce a 360 degree revolution of the adding machine equipment in the usual manner. Obviously, a manual crank could be used here in the known manner without invention. The opening at 112 indicated in the cover of the adding machine 113 is only for the purpose of viewing the accumulator wheels in the normal use of an adding machine and has no function in the present invention.

Beneath each of the rows of buttons from 100 to 109 inclusive, there is mounted for reciprocation lengthwise of the row, a rack bar 114. At its forward end, each rack bar has the teeth 114*a* which, in the normal use of an adding machine, coact with indicator or accumulator wheels to give the adding operations. They have no function in my modified machine. On the top of each rack bar there is formed a series of progressive steps as shown in Fig. 4, numbered from 1141 to 1148 inclusive. Button No. 1 has the lower end of its stem in position when the button is depressed to engage the shoulder 1141 as the rack bar 114 moves forwardly and this limits the rack bar to a small amount of movement. In similar manner, button No. 2 would be in position to engage shoulder 1142, button No. 3 would engage shoulder 1143, etc. Each of the buttons permits the associated rack bar to move forwardly a greater amount until button No. 8 as shown in dot-dash position in Fig. 4 would engage against the shoulder 114a and permit that amount of movement of the rack bar forwardly, if button No. 8 were depressed. If button No. 9 is depressed, it does not engage any similar shoulder but instead, the shoulder 114g on the lower side of the rack bar engages a fixed member of the frame 115 so as to limit the forward motion of the rack bar to its maximum amount. Means is provided as thoroughly described in the above mentioned Johantgen Patent No. 1,336,840 for locking each rack bar against forward movement except when a key in that row is depressed. As is well known, there is no zero button in any row, but if zero indication is desired in that row, no button is depressed. In that case, a leg 116 (Fig. 4) depending from the rack bar and key lock plates stands in front of the shoulder 114a and prevents any movement of the rack bar forwardly. Also as shown in the above mentioned patent, the depression of any button in a given row will move the leg 116 out of the path of the shoulder 114a so as to permit movement of the rack bar forwardly when initiated. These same control plates also have means for holding the keys in their depressed positions, and provides also that the depression of any key serves to release any previously depressed key in the same row. As shown in the above mentioned Victor patents, through the slots 114b in all of the rack bars 114 there extends a rod 117 entirely across the machine. This rod is carried in swinging arms on opposite sides of the machine. The two ends of rod 117 are engaged with the notched lower ends of two depending oscillating plates 118, one at each side of the machine. Each of the plates 118 is swung, during a part of the oscillation of the main shaft of the adding machine in each direction, by a cam roller 190, carried by the adjacent crank arm 191, which enters a flaring cam slot 118′ in the corresponding swinging plate. A spring 119 urges each rack bar 114 forwardly. When the machine goes through one cycle of operations, the rod 117 moves forward in each of the slots 114b, whereupon each rack bar 114 is moved forwardly by its associated spring 119 by the amount permitted by the various stop shoulders and abutments previously described.

It is of importance that the power required to operate the machine be substantially uniform, whatever the number of keys in use. To this end, a variable friction drag is provided by mounting a pair of washers 120 (Fig. 4) upon the rod 117 to bear against opposite sides of each rack bar under the pressure of suitable springs. As the active bars travel with the rod 117 they move without friction. It follows, therefore, that the load and the friction drag vary inversely with variations in the number of rack bars in action.

The movement of the various rack bars 114 forwardly, in response to the setting of the various indicia on the buttons indicated on Fig. 2, is utilized to set up the various electrical circuits described in connection with Fig. 1. I therefore modify the adding machine as best shown in Figs. 5, 6 and 7 to accomplish this purpose. Since each of the rows from 101 to 106 inclusive includes a row of nine buttons, I will describe Fig. 6 in connection with any such row. To this end, there is secured to each rack bar a small strip of insulation material 121 to which is secured an electrical contact 122 by any suitable means such as rivets 123. This contact has a downwardly projecting nose 122a which engages any one of a series of coacting contacts as will presently appear. The contact 122 is connected by a loop of electrical wire 124 with a bracket 125 which is fixed on a block 126 of insulation material mounted on the base of the modified adding machine. Another electrical wire 127 leads away from the bracket 125 and is connected to one side of the line $L_2$ as indicated in Fig. 1. The contact 122 or 122a therefore corresponds in position to the contact 27, 36, 43, or 19 of Fig. 1, which I have referred to as the movable or sliding contact.

Coacting with each of the movable contacts 122 or 122a is a series of stationary contacts adapted to be contacted according to the amount of movement of the associated rack bar 114. Referring to Figs. 5, 6 and 7, under each rack bar in the insulation block 126 is inserted a smaller block of insulation 128 having a series of pockets defined by small outstanding flanges 128a. In each of these pockets, there is secured to the block 128 a contact 129 as by means of a rivet 130. Each contact has a pair of upstanding spring fingers 129a adapted to engage on opposite sides of the contact projection 122a as it passes along between them. Electrically secured to each contact 129 is an electric conductor 131 which leads away eventually to the other side of the line $L_1$. These lines correspond to 38, 21 and 21′ of Fig. 1. In Fig. 6, the numbers from 0 to 9 inclusive have been placed over the series of contacts 129, not as actual numbers of these contacts for reference purposes, but merely to indicate that where a series of indicia on the main control instrument of Fig. 2 run from 1 to 9, as on row 103, the rack bar 114 will not move if no button is pushed and the contact 122a will remain in connection with the contact over which the numeral 0 appears in Fig. 6. On the other hand, if buttons 1 to 9 inclusive are selected, the rack bar will move in various amounts toward the right as viewed in Fig. 6 causing the contact 122a to engage any one of the contacts from 1 to 9 inclusive of Fig. 6, depending on whether the identical button were pushed in row 103. Thus, whatever buttons are set on the machine of Fig. 2, similarly numbered contacts of the nature of contact 129 will be engaged and these are diagrammatically shown at the lower left hand corner of the diagram of Fig. 1.

In connection with row 100 of Fig. 2, there would be only four of these contacts 129 plus the 0 contact. If button 100a were depressed, then the associated rack bar 114 would travel out one unit so as to cause the contact 27, similar to 122a, to engage a contact 129 whose connecting wire 131 in this case would correspond to the line marked 25 on Fig. 1. In a similar manner, if the RF button 100b were depressed, the associated rack bar 114 would travel outwardly two units so as to engage contact 54 of Fig. 1 which would be one of the contacts 129 previously described. In this case, the connecting wire would be that indicated at 53 on Fig. 1.

Means is provided for establishing the switch connections 17 and 30 of Fig. 1 automatically upon operation of the modified adding machine. To this end, an arm 132 rigidly mounted on shaft 133 (Fig. 3) carries a pair of switch control members 134 and 135, which are mounted on the arm at 136. The free end of arm 132 is connected by link 137 with a crank arm 138 on a rotatable cam 139 which turns approximately 360 degrees at each cycle of operation of the modified adding machine. Referring to Figs. 3 and 5, a block of insulating material 140 is secured to the bed of the adding machine. In this block are mounted spring material switch blades 141 to 144 inclusive. The blades 141 and 142 carry coacting contacts which establish the switch 17 of Fig. 1. The blades 143 and 144 carry coacting contacts which establish the switch 30 of Fig. 1. Upon operation of the main control instrument for one cycle, the arm 132 moves from the full line position of Fig. 3 to the dot-dash position there shown. This causes the switch control member 135 to first engage against the blade 142 to close switch 17 and shortly thereafter the switch control member 134 engages the blade 143 to close switch 30.

As mentioned above, operation of the modified adding machine may be by hand or by means of a motor. In the latter case, a motor 145 is mounted on the frame of the machine and connected with a suitable source of current controlled by a make and break switch 146. When the finger bar 111 of Fig. 2 is depressed, the attached leg 111*a* thereof is depressed also, engaging the pin 147 as shown in Fig. 3. Through suitable mechanism, this finally causes lever 148 to rock and the roller 149 carried thereby engages the leg of make and break switch 146 to close the circuit for energizing the motor 145. The parts 111*a*, 147, 148 and 149 correspond respectively with the parts 123*a*, 139, 255 and 257 of Uhlig Patent No. 2,019,439 and the operation of this part of the mechanism is there described. The operation will then continue until the cam 139 has made one revolution after which mechanism similar to that set forth in the Uhlig Patent No. 2,019,439 will permit the roller 149 to disengage the switch 146 which will then open and stop the motor. This one-revolution operation of an adding machine is well known in the industry.

As mentioned above, one of the objects of the present invention is to make a record of the date, the room number, and the fact that the radio (or television) was turned on or off. These operations might be done separately, but the human element would then enter in. It is an object of the present invention to eliminate this human element by making the record automatically with the turning on or turning off of the service in the individual room. To this end, printing mechanism is set up simultaneously with the pushing of the indicia buttons for selecting the desired room and for indicating that the device is to be turned on or off. Referring particularly to Figs. 2, 4 and 8, a series of vertically disposed type bars 100′ through 109′ inclusive is set up corresponding to the rows of buttons or indicia formerly described in connection with rows 100 to 109 inclusive. The type bar shown in Figs. 4 and 8 will be described as the bar 105′, although it will be understood that the same principles apply to each one of the ten type bars. Each type bar is provided with a full set of figure type on the rear face thereof, the lowest number being nearest the top and in the order of the indicia in the various rows of the machine shown in Fig. 2. For instance, the indicia on bar 100′ beginning at the top are RN, RF, TN, and TF. On bar 102′, the type reading from the top down will be from A to H inclusive and X at the bottom. On type bar 108′ the figures will be 1, 2 and 3 or 0, 1, 2 and 3, realizing that the 0 in this case would never be printed. On type bar 109′, there will be a vacant space at the top representing the 0 space, and then twelve type marked from January to December in abbreviated form, as indicated on the buttons of the machine of Fig. 2. It will be understood that the associated rack bar 114 for row 109 will have the necessary number of shoulders to select between the twelve months. Also the rack bar 114 associated with row 108 of the main instrument will need only three shoulders positioned according to the numerals 1, 2 and 3, with a 0 position where the date runs from the first to the ninth of the month. On all of the other type bars, the type on the bar will run from 0 at the top to 9 at the bottom as I have indicated in Fig. 8. The vertical movement of each type bar such as 105′ is controlled by the associated sliding rack bar 114. The connection between each rack bar 114 and the corresponding type bar comprises a link 150 and a bell crank lever 151. The several bell crank levers swing in vertical planes. For this purpose, they are journaled on a horizontal tie rod 152, which extends transversely between side plates of the recording mechanism at the extreme rear end of the machine. The bell crank 151 is connected to its associated type bar pivotally at the point 153. The type bars are intended to print through an inked ribbon 155, carried between spools 156, on to a paper strip 157 which is carried around a platen 158. The details of the platen and paper movement will be described later. A spring 154 between the type bar and the bell crank 151 urges the type bar away from printing position. A set of swinging hammers 160, one for each type bar, serve for forcing the type bars against the platen 158 to accomplish the printing operations. These hammers are loosely pivoted upon a transverse shaft 161. This shaft is journaled in the side plates of the recording mechanism. Rod 164 serves for restoring the hammers 160 after their operation. For this purpose, a pair of cranks 163 are rotatable upon the shaft 161, at opposite ends of the row of hammers, and restoring rod 164 extends between the cranks 163 in front of the hammer.

Each hammer 160 is actuated by a separate spring 165. Each of these springs extends from the corresponding hammer to a fixed transverse frame member 166, which also serves to guide the type bars at their upper ends. Each hammer 160 acts upon the corresponding type bar through a lever 167. These levers are pivotally supported upon a fixed transverse rod 168, one of the levers being aligned with each of the type bars and with a nose 169 carried by the corresponding hammer 160.

The printing hammers 160 are normally held against movement by a set of hammer locks 171, each of which engages in a notch 160*a* in the hammer 160. The hammer locks 171 are pivotally mounted upon a transverse rod 172, as by hooking the notch 171*a* over the rod 172. The rod 172 is carried by a swinging or rectifying frame 173 which is in turn oscillatable by means of a transverse shaft 174. In their advanced positions, the hammer locks 171 are held by engagement in their respective notches 160*a*. For this purpose a separate spring 176 extends from the lower end of each hammer lock to a lower cross piece 177 of the rectifying frame.

The rear edge of the cross piece 175 of the rectifying frame serves to align the type for printing by entering one of a series of notches 178 provided at the front end of the forwardly extending arm of the bell crank lever 151. The rectifying frame is swung rearwardly immediately prior to a printing operation by the engagement of a crank pin 179 mounted in a crank arm 180 carried by the projecting end of a control shaft 181 which is oscillated at each cycle of the adding machine from the position of Fig. 4 to the position of Fig. 8 and back again. The pin 179 engages in a notch 182 in an arm 183 which is pivoted at 192 on the frame. Early oscillation of arm 183 in a clockwise direction causes pin 193 to move cranks 163, causing rod 164 to move away from hammers 160. Further oscillation of arm 180 causes pin 179 to engage arm 194 which is secured to shaft 174 whereby to swing the rectifying frame.

Withdrawal of the hammer locks 171 only when characters are to be printed from the corresponding type bar is conveniently accomplished by providing each of the hammer locks with a forwardly projecting stop shoulder 171b. It follows from this construction that rearward movement of the rectifying frame 173, when any one of the bell crank levers 151 is in a normal position illustrated in Fig. 4, serves only to swing the lower end of the corresponding hammer lock 171 rearwardly without withdrawing the upper end of the hammer lock from the notch 160a of the corresponding hammer 160. On the other hand, when any one of the bell crank levers 151 has been raised by the forward movement of the corresponding rack bar 114, as in Fig. 8, rearward movement of the rectifying frame 173 causes the stop shoulder 171b of the corresponding hammer lock to fulcrum against the forward end of the bell crank lever 55 and swings the upper end of the hammer lock forwardly to release the corresponding hammer 160.

All of the above mechanism for setting the type bars and for printing a record is completely disclosed in the above mentioned Patent No. 1,336,840 to Johantgen, to which reference may be had for a more complete description. That patent also shows a convenient arrangement for printing the significant zeros as illustrated in Fig. 10 of the said patent and I also use that type of mechanism so as to print significant zeros.

Means is provided for properly feeding the paper strip 157 to the printing mechanism. Such devices are disclosed in the above mentioned Victor Adding Machine Company patents and particularly in Johantgen Patent No. 1,876,056 to which reference may be had for a more complete description. It is sufficient to state here that the unused strip is stored in the roll 184 and is then fed around the platen 158 where the printed record is made, and the printed record may be finally stored on a roll indicated at 185. Suitable mechanism is provided as described in the above mentioned patents for feeding this strip of paper, step-by-step, so that each item is printed on a fresh line. Hand wheels are indicated at 186 for moving the strip manually when desired.

The operation of my improved mechanism should now be clearly understood. If the occupant of a room or other individual station desires the energization of an electrical piece of equipment in his room, such as the radio loudspeaker 11 connected with suitable broadcast receiving sets as described, he calls the operator located at the central control instrument of Fig. 2. The operator then sets up on the control buttons indicia corresponding to the date, the room number where service is desired, and pushes, for instance, button 100a indicating that the radio is to be turned on. She then pushes the motor switch 111 which initiates a one revolution cycle of the modified adding machine. The rack bars 114 then move forward the predetermined amounts as determined by the buttons which were depressed. The button or buttons in rows 105 and/or 106 controlling the group of rooms usually in the hundreds on a given floor will set up potential circuits through a relay such as 31 in the case of the one-hundred series, or 23 in the case of two-hundred series or any other relay for the given series selected. At the same time the buttons in rows 104 and 103 will determine the individual station whose relay is to be eventually energized. It will be noted in the case of the room 212 that the line 41 connected with the button marked 1 in row 104 is common to all of the relays in the series from 10 to 19, while line 38 connected with the button marked 2 in row 103 is common to all of the relays for those rooms, the last number of which ends in 2, such as 02, 12, 22, and so forth. There is only one relay, namely, 39, which is common to the tens series and to the series of numbers ending in the figure 2. Thus, the relay 39 representing the number 12 is the only individual station relay set up for energization. By the operation of the modified adding machine, the switch control members 134 and 135 are carried forward closing the switches 17 and 30. These require, for the completion of the electrical circuit, the button 100a indicating radio "on" and its associated contact. Thus, the hundreds relay and the individual station relay previously set up by the rack bars 114 are now energized and these relays draw their armatures to actuated position. At the same time, the closing of switches 17 and 30 energize relay 32 so as to close its armature and set up a circuit through the energized hundreds relay, for instance, 23, and through the individual station relay, for instance, 39, and through the relay 14 in the selected room which energizes the radio receiver and broadcasting circuit and locks itself in by the interlock with the armature 15a as previously described. When the radio is to be turned off, the same process is gone through, except that the button in row 105 which selects the hundreds series relay, selects one of the off relays such as 52 or 55 previously described or another relay of the like sort for hundreds series selected. The other circuits are similar except that in the actuating circuit finally completed the button 100b is involved which turns the radio off. This establishes an actuating circuit when the modified adding machine goes through its cycle which passes through the armature of the radio off relay in the hundreds series, for instance, 52, and through the armature of the individual station relay, for instance, 39, and through the relay 15 in the selected room which is the relay for turning the service off. This relay 15, when actuated, draws its armature 15a to it, thus releasing the armatures of the relay 14 to return to their normal position cutting off the radio service in the room. Each time that the modified adding machine went through its cycle to turn the radio on or to turn the radio off, all of the necessary data was printed on the paper slip 157 by the same actuation of the modified adding machine which turned the radio service on or off. Thus the system is fool-proof and records as shown in Fig. 9 the date, the room number, and the information as to whether the radio was turned on or off at that time. The hotel, hospital or other institution may then arrange to charge for the service according to the record on the strip 157. I can see that my device might be useful for establishing and deenergizing the desired circuits whether or not a record of the same and of the time were made. I provide, however, a means of recording the time so that the system is foolproof. I conceive also that instead of setting up the time or date on the buttons in rows 107, 108 and 109, a time recorder might be set in position along the left-hand margin of the paper strip 157 as viewed in Fig. 9 so that the time was always available to be marked on the record if and when a record was made each time a circuit was established or deenergized.

The wiring of a system which otherwise would be undesirably complicated is not too difficult as I have arranged it. As previously pointed out, the lines for energizing and deenergizing the relays in the hundreds series are not complicated. In the case of the invidividual stations, a single wire connects all of the relays, the last digit of which ends in 1, or in 2, or in any other of the prime numbers. Also, a single wire serves for all of the relays for individual stations in the same "tens" series. I prefer to use multiple conductor cables for wiring large institutions such as hotels or hospitals so that these lines may be carried from floor to floor and the connections readily made as desired. The system is readily tested from a central station so that it is not difficult to maintain. The use of equipment has been minimized so as to make the system simple to install and efficient in its operation. By means of the various safeguards pointed out, I make it certain that only the desired relays will be energized and all others will either be shorted out or reverse circuits established which are impossible because of the dry disc rectifiers which have been described.

In Fig. 10, I have shown a modified construction or diagram for the equipment located inside of a box or cabinet 16′ having the same position in the diagram of Fig. 1 as the box 16 there shown. Referring back to Fig. 1, it will be noted that the energization circuit for the "off" relay 15 is by way of the armature 14*a* of relay 14 and lines 56 and 57. I find in actual practice that a small amount of dust may get between the armature 14*a* and the contact with line 56 preventing operation. The diagram of Fig. 10 shows a way to overcome this. In the modification of Fig. 10, it should be understood that the lines there indicated connect up with the diagram of Fig. 1 as will presently be explained, but that the power source $L_1$, $L_2$ has been modified so that the flow in the diagram of Fig. 10 is through exactly the same circuits as Fig. 1 but in the opposite direction. In the case of Fig. 10, the impulse to turn the radio on in the room comes through line 490 which is analogous to line 49 of Fig. 1. The rest of this circuit is through relay 14, line 480, rectifier 470 and line 460 which is analogous to line 46 of Fig. 1. This circuit is unable to energize relay 15 because the line through 560, relay 15 and line 570 is blocked by the rectifier 471 in line 570 which permits flow only in the direction of the arrow indicated. The impulse for turning the radio service off in Fig. 10 comes through line 570 which is analogous to line 57 of Fig. 1. The rest of this circuit is through relay 15, line 560, rectifier 470 and line 460 which is analogous to line 46 of Fig. 1 as previously mentioned. This is the only possible direction of flow in this last named circuit because the circuit is impossible from line 560 through line 480, relay 14 and line 490 because the rectifier 471 in line 490 permits flow in the direction of the arrow only. All other parts in Fig. 10 having the same reference characters as in Fig. 1 perform the same functions as previously described in connection with Fig. 1. I have thus provided an alternative type of construction wherein either relay 14 or relay 15 may be energized without going through the armature of another relay.

It should be understood that throughout the entire description if nothing has been said to the contrary, every relay is normally biased to its "off" or unoperated position and is moved to its operated position by energization of its associated relay.

The rectifiers mentioned at various times in the description and shown in the drawings at 47, 40, 470 and so forth, are of the dry disc rectifier type. I have indicated by the arrow at each rectifier, the direction of current flow which is permitted. Flow in the opposite direction cannot occur.

The spring 195 of Figs. 3 and 5 is for the purpose of insuring that rack bar 114 associated with row 100 remains forward for the full period desired. In connection with television, using TN and TF buttons, this rack bar had a tendency to start back too soon.

What I claim is:

1. In a communication system including a plurality of stations, each station being assigned combined first and second designating indicia, each station having a device to be energized, an "on" relay for each station operatively connected with its associated device to energize it responsive to instantaneous energization of said relay, an "off" relay for each station operatively connected with its associated device to de-energize it responsive to instantaneous energization of said relay, a modified adding machine for establishing selected electrical circuits, said machine including a small housing adapted to rest upon a desk, rows of buttons movably supported in said housing, said buttons in a first row carrying said first indicia and in a second row carrying said second indicia, and in a third row carrying device "on" and "off" indicia, a rack bar operatively connected with each of said rows, each said bar reciprocatingly mounted in said housing, operating means for reciprocating each bar including connections between each button and its associated bar for causing movement of the associated bar from an inoperative position to an operative position responsive to depression of its associated button, plural stop means associated with each rack bar for stopping it at selected predetermined points corresponding to the indicia button operated, normally open switch means for each row at each of said predetermined points and positioned in said housing for engagement by the associated bar, said bar closing said switch means only at the predetermined point where said bar is stopped by said stop means, electrical circuit means operatively connected with said "on" relay at each station and including switches closed by said rack bars of said first and second rows and including a switch closed by said rack bar of said third row responsive to its associated "on" indicia button, electrical circuit mean operatively connected with said "off" relay at each station and including switches closed by said rack bars of said first and second rows and including a switch closed by said rack bar of said third row responsive to its associated "off" indicia button, and means for clearing said modified adding machine including a first operating connection causing electrical energization of said electrical circuit means and a second operating connection causing return of said bars to inoperative position.

2. The combination of claim 1 including time indicia carrying buttons mounted in said machine, movable time rack bars in said housing having means for moving said bars to predetermined selected positions responsive to actuation of said time indicia carrying buttons, movable printing devices in said housing operatively connected with all of said rack bars and movable by movement of said bars to printing positions corresponding to associated bar positions, a recording sheet engageable by said printing devices when the latter are moved to printing position, and means operable by said clearing means for causing movement of said printing devices into and away from printing position.

LOUIS E. PHILIPPS.

References Cited in the file of this patent

UNITED STATES PATENTS

| Number | Name | Date |
|---|---|---|
| 1,600,358 | Puckette | Sept. 21, 1926 |
| 1,877,635 | Antoniono | Sept. 13, 1932 |
| 1,965,393 | Schleicher et al. | July 3, 1934 |
| 2,237,767 | Schott | Apr. 8, 1941 |
| 2,407,411 | Folis | Sept. 10, 1946 |
| 2,413,883 | Mills et al. | Jan. 7, 1947 |
| 2,421,060 | Haskins | May 27, 1947 |
| 2,484,733 | Rahmel et al. | Oct. 11, 1949 |
| 2,484,734 | Rahmel | Oct. 11, 1949 |
| 2,513,112 | O'D. Shepherd | June 27, 1950 |
| 2,514,086 | Owens | July 4, 1950 |
| 2,517,316 | Holmes | Aug. 1, 1950 |